United States Patent
Ahmed

(10) Patent No.: US 10,004,241 B2
(45) Date of Patent: Jun. 26, 2018

(54) ELECTRIC ROASTER AND SMOKER

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 942 days.

(21) Appl. No.: 14/072,266

(22) Filed: Nov. 5, 2013

(65) Prior Publication Data

US 2014/0130683 A1    May 15, 2014

Related U.S. Application Data

(60) Provisional application No. 61/726,703, filed on Nov. 15, 2012.

(51) Int. Cl.
*A23B 4/052* (2006.01)

(52) U.S. Cl.
CPC .................. *A23B 4/052* (2013.01)

(58) Field of Classification Search
CPC ..... A23B 4/052; A23B 4/0523; A23B 4/0526; A23B 4/044; A23B 4/053; F24H 3/0405; F24H 3/027; F24H 3/022; F24H 3/0464
USPC ............ 99/473–475; 110/204; 219/209, 391, 219/400, 392–393, 443.1, 445.11, 445.12, 219/449.1, 460.1; 126/99 R, 106, 104 R, 126/1 R, 15 R, 15 A, 19 R, 21 A
See application file for complete search history.

(56) References Cited

U.S. PATENT DOCUMENTS

| | | | |
|---|---|---|---|
| 1,158,986 A | 11/1915 | Cronwall |
| 1,399,704 A | 12/1921 | Eida |
| 2,001,615 A | 5/1935 | William |
| 3,155,814 A | 11/1964 | Appleman et al. |
| 3,245,458 A | 4/1966 | Patrick et al. |
| 3,277,948 A | 10/1966 | Best |
| 3,437,415 A | 4/1969 | Davis et al. |
| 3,561,902 A | 2/1971 | Best |
| 3,586,825 A | 6/1971 | Hurley |
| 3,663,798 A | 5/1972 | Speidel et al. |
| 3,683,058 A | 8/1972 | Partiot |

(Continued)

FOREIGN PATENT DOCUMENTS

| DE | 10215 688 A1 | 6/2003 |
|---|---|---|
| EP | 0 221 686 | 10/1986 |

(Continued)

OTHER PUBLICATIONS

PCT/US2013/068524, "International Search Report and Written Opinion"; dated Apr. 3, 2014; Applicant: W.C. Bradley Co.; Published in: WO.

(Continued)

*Primary Examiner* — Michael Hoang
(74) *Attorney, Agent, or Firm* — Dennis D. Brown; Brown Patent Law, P.L.L.C.

(57) ABSTRACT

An upright electric roaster and smoker having an air flow passage outside of, and adjacent to, the food heating chamber. The air flow passage has an upper inlet in the heating chamber so that air flows upwardly through the heating chamber from a bottom air inlet and subsequently flows downwardly through the air flow passage from the upper inlet of the passage to an outlet located in a lower portion of the passage.

11 Claims, 10 Drawing Sheets

(56) References Cited

U.S. PATENT DOCUMENTS

| | | |
|---|---|---|
| 3,861,378 A * | 1/1975 | Rhoads .................... A21B 1/50 126/21 A |
| 3,941,117 A | 3/1976 | Pei et al. |
| 4,024,839 A | 5/1977 | Reid, Jr. et al. |
| 4,039,275 A | 8/1977 | McGettrick |
| 4,057,670 A | 11/1977 | Scheidler |
| 4,140,100 A | 2/1979 | Ishihara |
| 4,207,456 A | 6/1980 | Best |
| 4,235,023 A | 11/1980 | Best |
| 4,276,869 A | 7/1981 | Kern |
| 4,321,857 A | 3/1982 | Best |
| 4,375,802 A | 3/1983 | Wallasvaara |
| 4,403,541 A | 9/1983 | Berger |
| 4,403,597 A | 9/1983 | Miller |
| 4,426,792 A | 1/1984 | Best |
| 4,437,833 A | 3/1984 | Mertz |
| 4,508,097 A | 4/1985 | Berg |
| 4,537,492 A | 8/1985 | Lein et al. |
| 4,546,553 A | 10/1985 | Best |
| 4,569,657 A | 2/1986 | Laspeyres |
| 4,575,616 A | 3/1986 | Bergendal |
| 4,606,261 A | 8/1986 | Bernardi |
| 4,715,356 A | 12/1987 | Reynolds |
| 4,730,100 A * | 3/1988 | Pingelton ............... A47J 39/003 219/386 |
| 4,785,552 A | 11/1988 | Best |
| 4,798,192 A | 1/1989 | Maruko |
| 4,824,644 A * | 4/1989 | Cox .......................... A61L 2/06 126/21 A |
| 4,829,158 A * | 5/1989 | Burnham ............. F24C 15/325 126/21 A |
| 4,839,502 A | 6/1989 | Swanson et al. |
| 4,883,423 A | 11/1989 | Holowczenko |
| 4,886,044 A | 12/1989 | Best |
| 4,909,137 A | 3/1990 | Brugnoli |
| 4,960,977 A | 10/1990 | Alden |
| 5,024,209 A | 6/1991 | Schaupert |
| 5,028,760 A | 7/1991 | Okuyama |
| 5,062,408 A | 11/1991 | Smith et al. |
| 5,062,788 A | 11/1991 | Best |
| 5,111,803 A | 5/1992 | Barker et al. |
| 5,218,952 A | 6/1993 | Neufeldt |
| 5,230,161 A | 7/1993 | Best |
| 5,240,411 A | 8/1993 | Abalos |
| 5,277,106 A | 1/1994 | Raymer et al. |
| 5,279,277 A | 1/1994 | Barker |
| 5,306,138 A | 4/1994 | Best |
| 5,313,877 A | 5/1994 | Holland |
| 5,363,567 A | 11/1994 | Best |
| 5,488,897 A | 2/1996 | Snyder |
| 5,494,003 A | 2/1996 | Bartz et al. |
| 5,509,403 A | 4/1996 | Kahlke et al. |
| 5,513,623 A | 5/1996 | Hong |
| 5,566,607 A | 10/1996 | Schleimer |
| 5,567,459 A | 10/1996 | Gonzalez-Hernandez et al. |
| 5,571,009 A | 11/1996 | Stalhane et al. |
| 5,582,094 A | 12/1996 | Peterson et al. |
| 5,594,999 A | 1/1997 | Best |
| 5,599,471 A | 2/1997 | Zaidman |
| 5,676,043 A | 10/1997 | Best |
| 5,711,661 A | 1/1998 | Kushch et al. |
| 5,752,653 A * | 5/1998 | Razzaghi ........... A47G 23/0216 206/515 |
| 5,761,990 A | 6/1998 | Stewart et al. |
| 5,782,166 A | 7/1998 | Lin |
| 5,823,099 A | 10/1998 | Ko |
| 5,879,154 A | 3/1999 | Suchovsky |
| 5,890,422 A | 4/1999 | Clark et al. |
| 5,989,013 A | 11/1999 | Gray |
| 6,114,666 A | 9/2000 | Best |
| 6,159,001 A | 12/2000 | Kushch et al. |
| 6,190,162 B1 | 2/2001 | Smith et al. |
| 6,205,996 B1 | 3/2001 | Ryan |
| 6,461,150 B1 | 10/2002 | Sirand |
| 6,615,908 B1 * | 9/2003 | Bosher .................. A23L 3/3418 165/263 |
| 6,657,168 B1 | 12/2003 | Lazzer |
| 6,779,519 B2 | 8/2004 | Harneit |
| 6,783,226 B2 | 8/2004 | Szlucha |
| 7,202,447 B2 | 4/2007 | Kingdon et al. |
| 7,219,663 B2 | 5/2007 | Cuomo |
| 7,726,967 B2 | 6/2010 | Best |
| 2001/0036610 A1 | 11/2001 | Wood |
| 2002/0020405 A1 | 2/2002 | Coleman et al. |
| 2004/0011350 A1 | 1/2004 | Dowst et al. |
| 2004/0060552 A1 | 4/2004 | Yamada et al. |
| 2004/0152028 A1 | 8/2004 | Singh et al. |
| 2004/0250688 A1 | 12/2004 | Farkas et al. |
| 2005/0204934 A1 | 9/2005 | Robertson |
| 2005/0226976 A1 | 10/2005 | Chung |
| 2006/0003279 A1 | 1/2006 | Best |
| 2006/0021517 A1 | 2/2006 | Best |
| 2006/0266979 A1 | 11/2006 | Ra |
| 2007/0125357 A1 | 6/2007 | Johnston |
| 2007/0131234 A1 | 6/2007 | Moore |
| 2008/0072890 A1 | 3/2008 | Best |
| 2008/0121117 A1 | 5/2008 | Best |
| 2011/0186561 A1 | 8/2011 | Ahmed |
| 2012/0222665 A1 | 9/2012 | Ahmed |

FOREIGN PATENT DOCUMENTS

| | | |
|---|---|---|
| EP | 1 028 292 A1 | 8/2000 |
| EP | 1 096 203 | 5/2001 |
| FR | 1 129 123 | 1/1957 |
| FR | 1 204 968 | 1/1960 |
| FR | 1387132 | 1/1965 |
| FR | 70 02058 | 9/1971 |
| FR | 2472141 | 12/1980 |
| GB | 23552 | 3/1915 |
| GB | 432481 | 12/1933 |
| GB | 562136 | 6/1944 |
| GB | 576377 | 4/1946 |
| GB | 1029774 | 7/1963 |
| GB | 1339345 | 12/1973 |
| GB | 2 362 451 | 11/2001 |
| GB | 2 409 265 | 6/2005 |
| JP | 2000 121064 | 4/2000 |
| JP | 2004 179089 | 6/2004 |
| WO | WO 2004103133 A1 | 12/2004 |
| WO | WO 2006080949 A2 | 8/2006 |
| WO | WO 2008125258 A2 | 10/2008 |
| WO | WO 2011002714 A1 | 1/2011 |

OTHER PUBLICATIONS

Char-Broil, "Assembly Instructions for Models 6320, 6321 & 6323"; 1992, pp. 1-18.

P. Sheridan, et al., "Application of Far Infra-Red Radiation to Cooking of Meat Products"; 1999; pp. 203-208 (Abstract Only), vol. 1, No. 3/4; Publisher: Journal of Food Engineering; Published in: US.

Sheridan, et al., "Application of Far Infra-Red Radiation to Cooking of Meat Products"; 1999; pp. 2003-2008, vol. 41; Publisher: Journal of Food Engineering; Published in: US.

Sheridan, et al., "Analysis of Yield While Cooking Beefburger Patties Using Far Infrared Radiation"; 2002; pp. 3-11, vol. 51; Publisher: Journal of Food Engineering; Published in: US.

N.C. Shilton, et al., "Determination of the Thermal Diffusivity of Ground Beef Patties Under Infrared Radiation Oven-Shelf Cooking"; Mar. 2002; pp. 39-45 (Abstract Only), vol. 52, No. 1; Publisher: Journal of Food Engineering; Published in: US.

N. Shilton, et al., "Modeling of Heat Transfer and Evaporate Mass Losses During the Cooking of Beef Patties Using Far-Infrared Radiation"; 2002; pp. 217-222 (Abstract Only), vol. 55, No. 3; Publisher: Journal of Food Engineering; Published in: US.

Y. Takahashi, et al., "Impact of IR Broiling Onthe Thiamin and Riboflavin Retention and Sensory Quality of Salmon Steaks for Foodservice Use"; 1987; pp. 4-6 (Abstract Only), vol. 52, No. 1; Publisher: Journal of Food Science; Published in: US.

(56) References Cited

OTHER PUBLICATIONS

"Cross Section of G3000 Cabinet Unit"; Sep. 4, 2001; Publisher: Thermal Engineering Corp., Columbia, SC; Published in: US.
"Cross Section of G-Series Burner System"; Sep. 4, 2001; Publisher: Thermal Engineering Corp., Columbia, SC; Published in: US.

\* cited by examiner

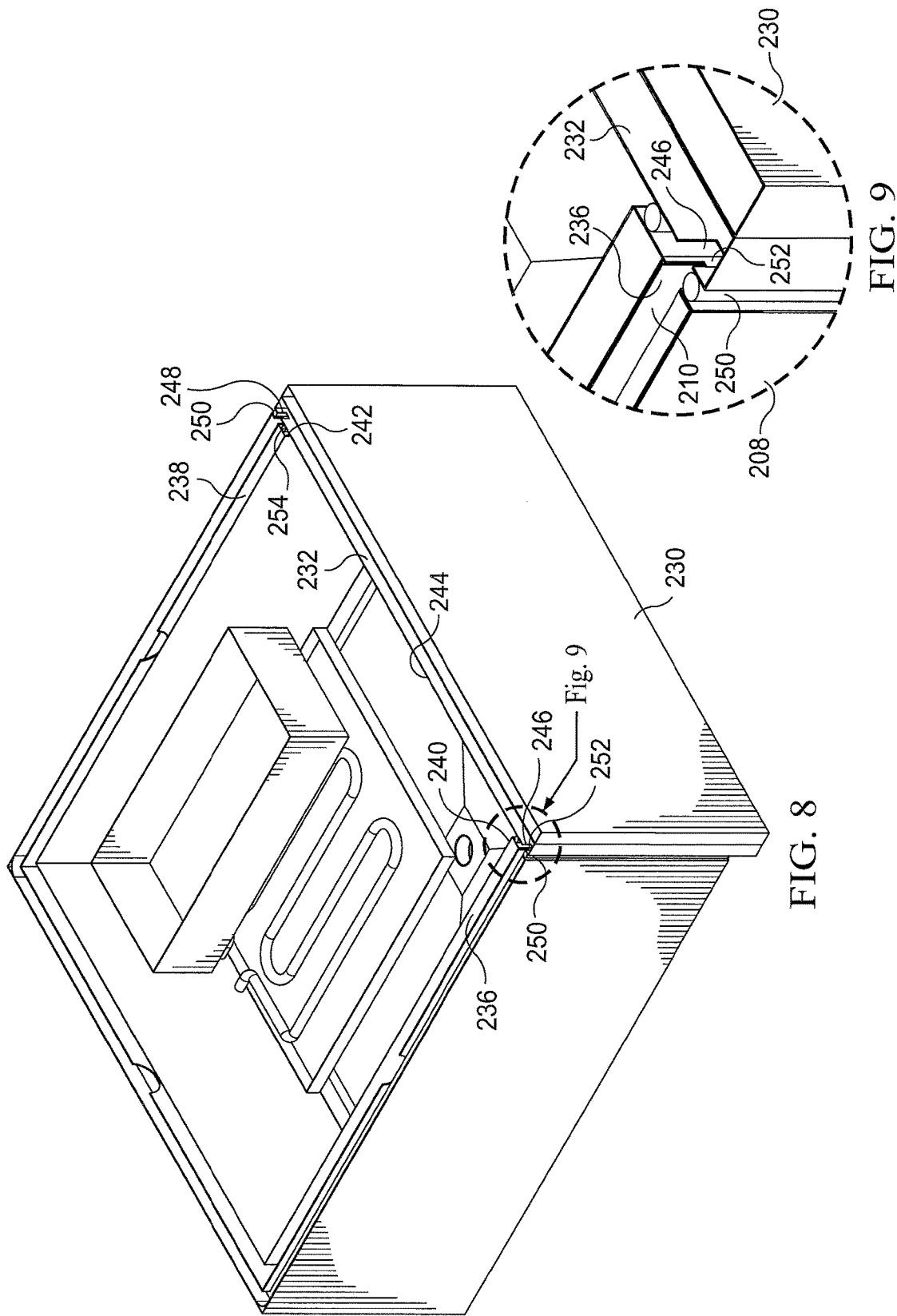

ELECTRIC ROASTER AND SMOKER

RELATED CASE

This application claims the benefit of U.S. Provisional Patent Application Ser. No. 61/726,703 filed on Nov. 15, 2012 and incorporates said provisional application by reference into this document as if fully set out at this point.

FIELD OF THE INVENTION

The present invention relates to upright electrical apparatuses and methods for roasting and smoking food products.

BACKGROUND OF THE INVENTION

Upright electric roasters and smokers heretofore known in the art have typically comprised: an upright rectangular box having a front access door; an electrical heating element in the bottom of the upright box; a water pan positionable in the box above the heating element; a tray or pan below or above the water pan for holding wood chips or wood pellets for producing smoke; a plurality of food support racks spaced above the heating element and water pan; an air intake port typically centered in the bottom of the box; and a single vent opening in the top of the box. Some units have also included cooking temperature controllers for sensing the temperature of the air or of the food product within the box and controlling the temperature by adjusting the energy output of the electrical heating element.

Unfortunately, the prior art upright electrical roasting and smoking box units have had various significant shortcomings and deficiencies. Because of the direct venting of the hot gas from the top of the box, the thermal efficiency of the prior art electric roasters and smokers has been relatively low. In addition, the direct venting of the hot air from the top of the box also creates a relatively high level of convective air flow through the unit which dries the food product and quickly carries the moisture out of the roasting/smoking chamber.

To reduce the amount of heat loss from the prior art upright unit and to improve its thermal efficiency, a layer of insulation has often been provided between the interior wall and an outer wall of the upright rectangular box. However, the addition of an insulation layer is costly and makes the manufacturing process significantly more complex. Further, in order to protect the insulating material from damage, the maximum roasting and/or smoking temperature of a typical prior art box unit has been limited to such a degree that the unit could only be used for slow roasting and smoking. Because of the inefficiency of the prior art electrical box units and the need to protect the insulating layer from heat damage, the prior art units have typically been only able to operate at a maximum roasting and/or smoking temperature of about 275° F.

In addition, the use of a water pan in the prior art upright electrical roaster and smoker has been necessary in order to counteract the product moisture losses caused by convective drying and rapid air discharge. The need to fill and install the water pan and then remove and empty the pan after use creates a safety hazard (e.g., from hot water burns) and complicates the roasting and smoking process. Moreover, the necessity of using a water pan in the prior art unit is also disadvantageous in that (a) the water pan takes up valuable space within the upright box, (b) a significant amount of energy is required in the prior art unit simply to heat the water to the desired operating temperature, and (c) when the unit is operated at a temperature of 212° F. or above the water in the water pan boils and can produce so much water vapor that the amount of condensate and carbon particles which deposit on the product can be too great to allow the smoke to penetrate the product properly.

SUMMARY OF THE INVENTION

The present invention provides an upright electric roasting and smoking apparatus and method which alleviate the problems and deficiencies discussed above and also provide further significant advantageous and benefits over the prior art.

In one aspect, there is provided an electric roasting and/or smoking apparatus comprising:
  (a) an upright housing having (i) an upright housing wall which forms at least three upright interior sides of the housing, (ii) a closed top, and (iii) a door on one upright side of the housing for opening and closing the apparatus;
  (b) an upright interior heating chamber wall positioned within the housing;
  (c) an upright internal heating chamber defined within the upright interior heating chamber wall; and
  (d) at least one electrical heating element positioned in a lower end portion of the heating chamber.

The upright heating chamber wall is preferably positioned adjacent to and spaced inwardly apart from the interior surface of the upright housing wall such that an air flow gap is formed between the upright interior heating chamber wall and the interior surface of the housing wall. Prior to venting, the hot air produced in the unit travels downwardly through the air flow gap to thereby increase the temperature of the interior heating chamber wall. The air flow gap is preferably formed outside of the interior heating chamber wall on at least three of the upright interior sides of the housing, but can alternatively be provided on just one or just two interior sides of the housing.

The air flow gap has an upper air inlet located within an upper portion of the housing for receiving hot air which flows upwardly through the internal heating chamber. The air flow gap also has a lower air outlet which is provided through the upright housing wall and which is positioned elevationally below the upper air inlet such that the hot air received in the upper air inlet flows downwardly through the air flow gap and out of the lower air outlet. Further, the upper air inlet and the lower air outlet of the air flow gap are preferably configured such that the hot air flows into, through, and out of the air flow gap on at least three upright interior sides of the housing.

The inventive upright electric roasting and/or smoking apparatus is preferably a rectangular unit wherein the upright housing and the upright interior heating chamber each preferably have a substantially rectangular horizontal cross-sectional shape. However, the upright housing and the upright interior heating chamber can alternatively have substantially circular or other curved or partially curved cross-sectional shapes. As used herein and in the claims, unless otherwise specified, terms such as "side" and "upright side" of the inventive apparatus (e.g., the upright left, right, back, and front sides of the inventive apparatus) encompass and include sides having horizontal cross-sectional shapes which are either flat, substantially flat, curved, or partially curved.

In another aspect, in addition to the air flow gap which is provided on one, two, or three sides of the upright heating chamber, an air flow gap can also be provided in the upright door of the inventive apparatus. The air flow gap provided in the door will preferably be formed between a first upright interior wall of the door and a second interior wall or panel of the door which is spaced inwardly apart from the first interior wall of the door. The air flow gap provided in the door can be formed such that, when the door is closed, the air flow gap in the door is either (a) a continuation of the air flow gap provided on the other interior sides of the housing or (b) a separate air flow gap.

The inventive improved upright electric roasting and/or smoking apparatus provides significant advantages and benefits over the prior art. Rather than directly discharging the hot air from the top of the unit, the inventive apparatus routes the hot air downwardly through an air flow gap provided behind at least one upright side, more preferably behind at least three upright sides, of the interior heating chamber wall. Consequently, instead of merely being dumped directly to the atmosphere, the hot air generated in the inventive apparatus operates to further heat and increase the temperature of the interior heating chamber wall. This additional heating of the heating chamber wall operates to: (a) increase the thermal efficiency of the inventive apparatus by recovering significant additional heat from the hot air before venting and (b) increase the amount of infrared radiant energy emitted from the interior heating chamber wall toward the food product.

Moreover, the routing of the hot air produced in the inventive upright apparatus through the air flow gap outside of the interior heating chamber wall also operates to beneficially increase the back pressure within the inventive apparatus during operation. This beneficial increase in back pressure acts to reduce the excess cold air intake into the bottom of the apparatus so that the amount of excess cold air which must be continually heated by the apparatus is reduced. In addition, by reducing the amount of excess air flowing through the heating chamber, the intensity and amount of the convective air contact with the product is beneficially reduced so that the percentage of infrared versus convective heat transfer in the unit is increased and the amount of moisture removed from the product is thereby reduced. Further, by decreasing the amount of excess air flow through the inventive unit, the residence time of the hot air within the heating chamber is increased so that a greater amount of the moisture which is initially absorbed by the hot air, as well as additional moisture added to the hot air when producing smoke, is allowed to recondense on the food product. Consequently, although, if desired, the inventive apparatus can optionally include a water pan, the use of water pan in the inventive apparatus is not necessary.

Thus, as a result of and in addition to these improvements, the inventive upright electric roasting and/or smoking apparatus can be operated at the same roasting and/or smoking temperature as the prior art units, but with significantly less fuel consumption and with a more moist product. Alternatively, the inventive apparatus can be operated at significantly higher temperatures of up to 350° F. in order to cook the food product even faster. Moreover, the interior heating chamber wall and the interior air flow gap provided in the inventive apparatus behind the heating chamber wall operate to shield and protect the interior wall of the housing from direct exposure to temperature conditions within the heating chamber. Consequently, higher roasting and/or smoking temperatures can be employed in the inventive apparatus without damaging any insulating layer which may be provided within the housing wall.

Further aspects, features, and advantages of the present invention will be apparent to those of ordinary skill in the art upon examining the accompany drawings and upon reading the following detailed description of the preferred embodiments.

BRIEF DESCRIPTION OF THE DRAWINGS

FIG. 8 is a cutaway top perspective view of the inventive upright electric roasting and smoking apparatus 200 showing an alternative door venting assembly.

FIG. 9 is an enlarged view of Detail A highlighted in FIG. 8.

DETAILED DESCRIPTION OF THE PREFERRED EMBODIMENTS

Figure 1:
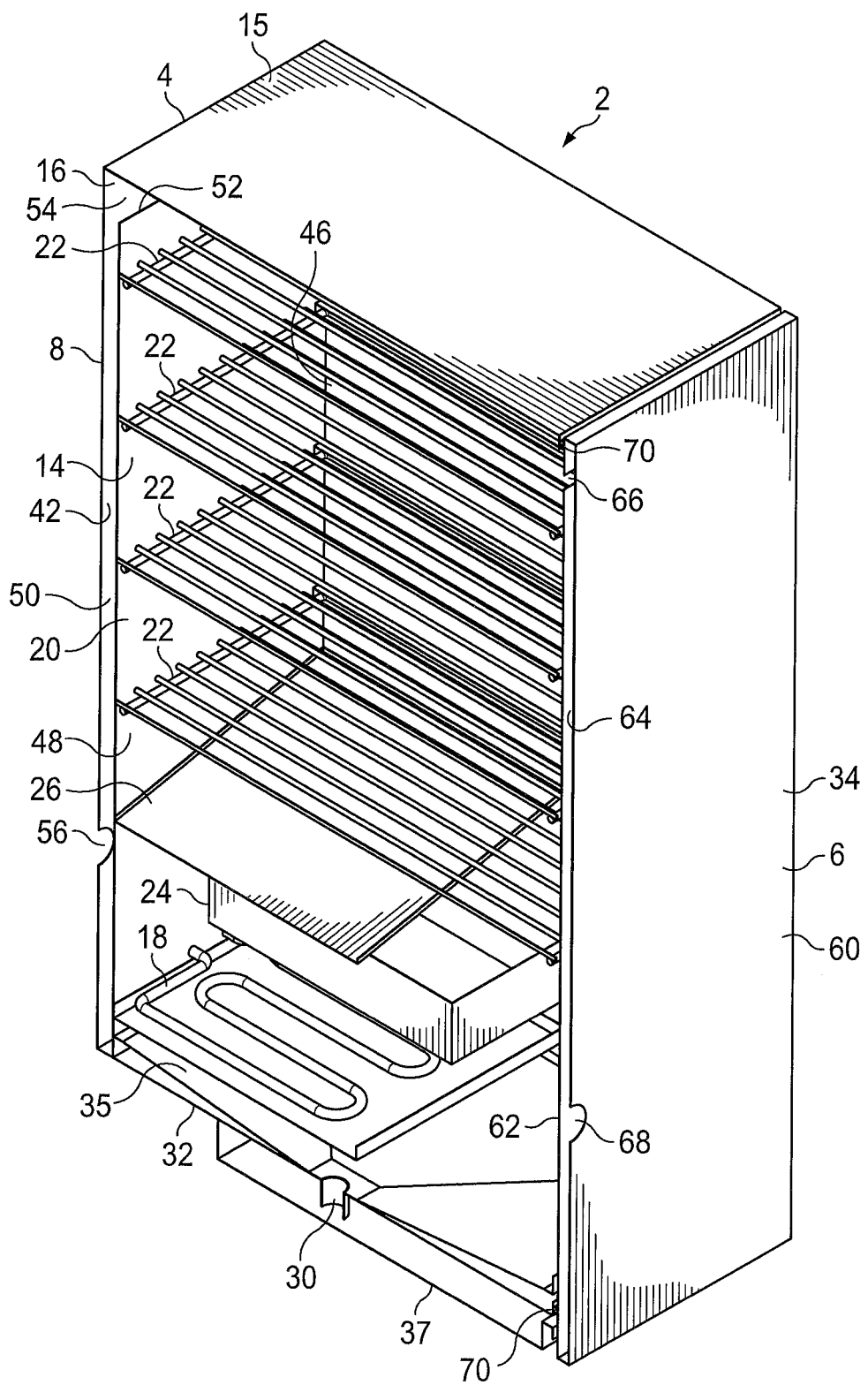
FIG. 1 is a cutaway perspective view of an embodiment 2 of the inventive upright electric roasting and smoking apparatus.
Figure 2:
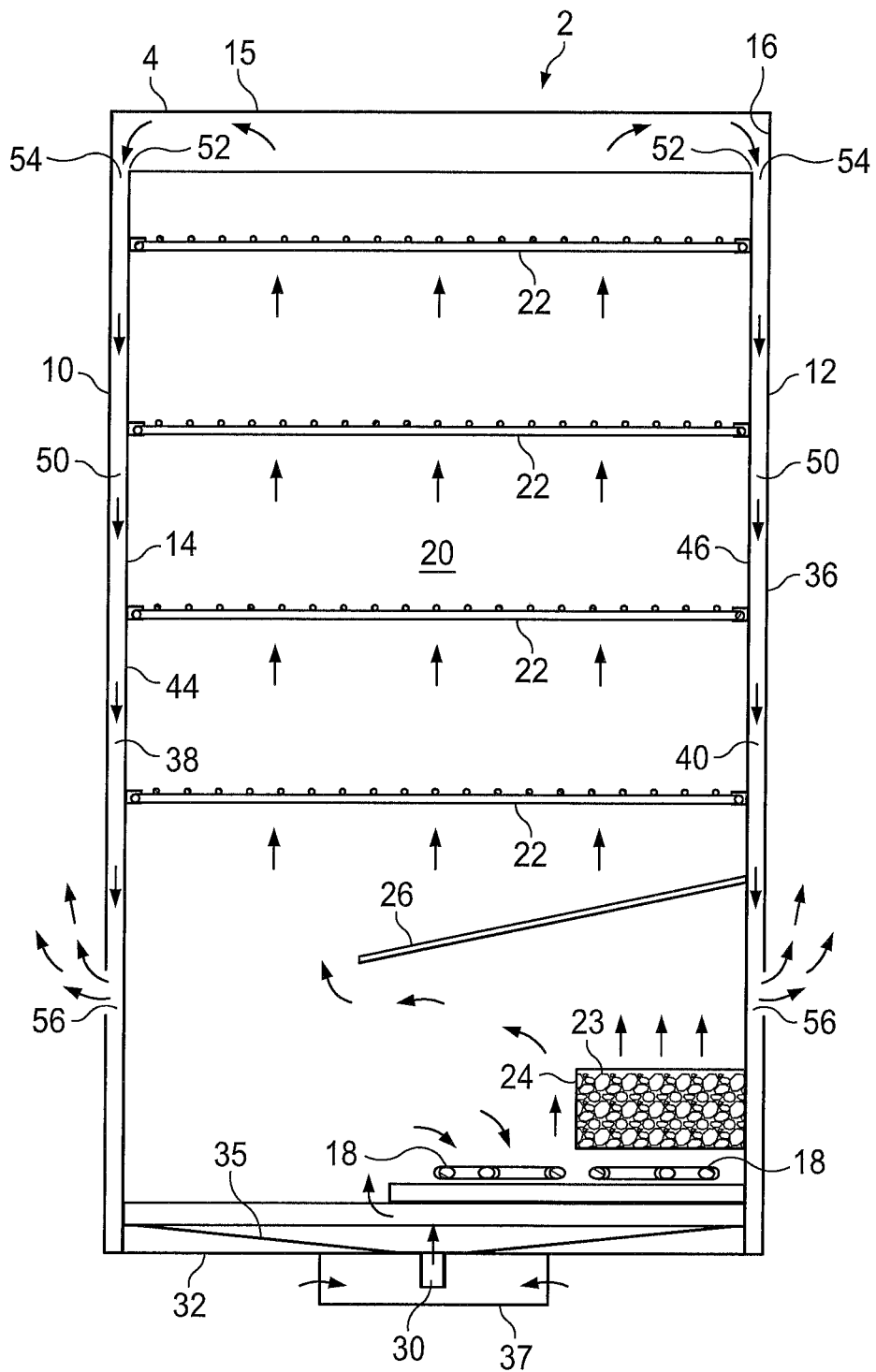
FIG. 2 is a schematic cutaway front elevational view of the inventive upright electric roasting and smoking apparatus 2.

An embodiment 2 of the inventive upright electric apparatus for roasting and/or smoking food products is illustrated in FIGS. 1 and 2. The inventive upright apparatus 2 comprises: an upright outer housing 4 having a front side 6, a back side 8, a left side 10, a right side 12, and a closed top 15; an upright heating chamber wall 14 within the interior 16 of the outer housing 4; an upright interior heating chamber 20 which is defined within the heating chamber wall 14; one or more electrical heating elements 18 positioned in the bottom portion of the heating chamber 20; one or more (preferably at least three or four) food support racks 22 spaced above the electrical heating element(s) 18 within the heating chamber 20; a smoker box 24 (e.g., a removably insertable pan or tray) positionable within the heating chamber 20 above the electrical heating element(s) 18 for holding wood pellets or chips 23; and one or more barrier or baffle trays 26 positioned in the heating chamber 20 above the electrical heating element(s) 18. The barrier tray 26 prevents drippage onto the electric elements 18, shields the food products on the lower rack 22 from direct exposure to the electric elements 18, and helps distribute the flow of air received through the cold air opening 30 in the bottom 32 of the housing 4 for better heating of the air and better delivery through the unit.

The inventive upright apparatus 2 also comprises an upright door 34 which is pivotably attached to the front side 6 of the housing 4 for opening, closing, and sealing the interior 16 of the housing 4; a sloped internal floor 35 for draining drippage from the food products through the bottom air opening 30; and a drip pan 37 provided beneath the bottom air opening 30.

In the inventive apparatus 2, the upright outer housing 4 has only a single upright wall 36 which has a left interior side 38, a right interior side 40, and a back interior side 42. Correspondingly, the upright interior heating chamber wall 14 has upright left, right, and back walls 44, 46, and 48 which are positioned adjacent to and are spaced inwardly apart from the interior left, right, and back walls 38, 40, and 42 of the housing wall 36 such that an interior air flow gap 50 is formed between the inner surface of the housing wall 36 and the interior heating chamber wall 14 within the back, left, and right sides 8, 10, and 12 of the inventive upright apparatus 2.

The top end 52 of the upright interior heating chamber wall 14 is spaced vertically below the closed top 15 of the housing 4 such that a gap 54 is formed within the upper interior end portion of the housing 4 between the top end 52 of the interior heating chamber wall 14 and the closed top 15 of the housing 4. The gap 54 provides an upper hot air inlet 54 for the interior air flow gap 50. Exhaust openings 56 for the air flow gap 50 are provided through the left, right, and back sides 8, 10, and 12 of the housing wall 36 at a location which can be anywhere which is at least about one inch above the heating elements 18. The location of the exhaust openings 56 is preferably at or below the vertical center of the housing 4. The exhaust openings 56 are more preferably located below the elevational center of the housing 4 and are most preferably at a location which is from about 60% to about 98% of the distance downward from the interior top 55 of the housing 4 to the heating element(s) 18.

Consequently, during operation, cold air is received through the bottom opening 30 of the housing 4 and is heated by the electrical heating element(s) 18. The heated air flows upwardly through the interior heating chamber 20 and then into the upper hot air inlet 54 of the air flow gap 50. Next, the hot air flows downwardly through the airflow gap 50 behind the upright left, right and back sides 44, 46, and 48 of the interior heating chamber wall 14 and is discharged to the atmosphere via the exhaust openings 56 which are preferably provided through the lower halves of the upright back, left, and right sides 8, 10, and 12 of the housing wall 36.

Similarly, the door 34 of the inventive apparatus 2 is a double-walled structure comprising: an outer vertical wall 60; an inner vertical wall 62 spaced apart from the outer wall 60; a vertical air flow gap 64 between the inner wall 62 and the outer wall 60; an upper hot air inlet opening 66 formed through the door inner wall 62; a lower hot air discharge outlet 68 formed through the door outer wall 60; and a seal 70 attached around the inner periphery of the inner wall 62, or around the door opening of the housing 4, for sealing the front opening of the apparatus 2 when the door 34 is closed.

It will be understood, however, that the door 34 of the inventive apparatus could alternatively be, for example, a solid door or a door having an insulating air gap or a layer of insulation 37 therein.

In the inventive apparatus 2, the inner surface of the upright wall 36 of the outer housing 4 and the inner surface of the outer wall 60 of the door 34 are preferably formed of a highly reflective material such as aluminized steel in order to reduce heat loss through the housing 4 and through the door 34 and to provide further heating to the interior heating chamber wall 14 and to the inner wall 62 of the door which surround the heating chamber 20.

The interior heating chamber wall 14 and the inner wall 62 of the door 34 will preferably be formed of steel or stainless steel and will most preferably have a high emissivity coating, such as a black porcelain coating, on the interior surfaces thereof facing the heating chamber 20, or on both the interior and exterior surfaces thereof, in order to increase the amount of infrared radiant energy emitted from the inner surfaces toward the food product within the heating chamber 20.

Although the upper hot air inlet 54 of the air flow gap 50 is shown in FIGS. 1 and 2 as being formed by a gap between the upper end 52 of the interior heating chamber wall 14 and the closed top 15 of the housing 4, it will be understood that other types of air openings or other air opening configurations could alternatively be used. As one example, the interior heating chamber wall 14 could alternatively extend all the way to the closed top 15 of the housing 4 with holes, slots, or other openings being provided through the upper portion of the interior heating chamber wall 14 to form the upper air inlet for the air flow gap 50. Further examples are discussed below.

Tests conducted at an operating temperature of 275° F. using a prototype of the inventive upright electrical apparatus illustrated in FIG. 1 versus an insulated prior art electrical roaster and smoker showed that (a) the inventive apparatus 2 was 50% more energy efficient and (b) the percentage of infrared cooking energy provided by the inventive apparatus was 68% whereas the prior art unit was only 60% infrared. In addition, the required roasting and smoking time for the inventive apparatus 2 was less than 6 minutes (actually only about 5 minutes) per pound of turkey versus about 10 minutes per pound of turkey for the prior art apparatus.

Figure 3:
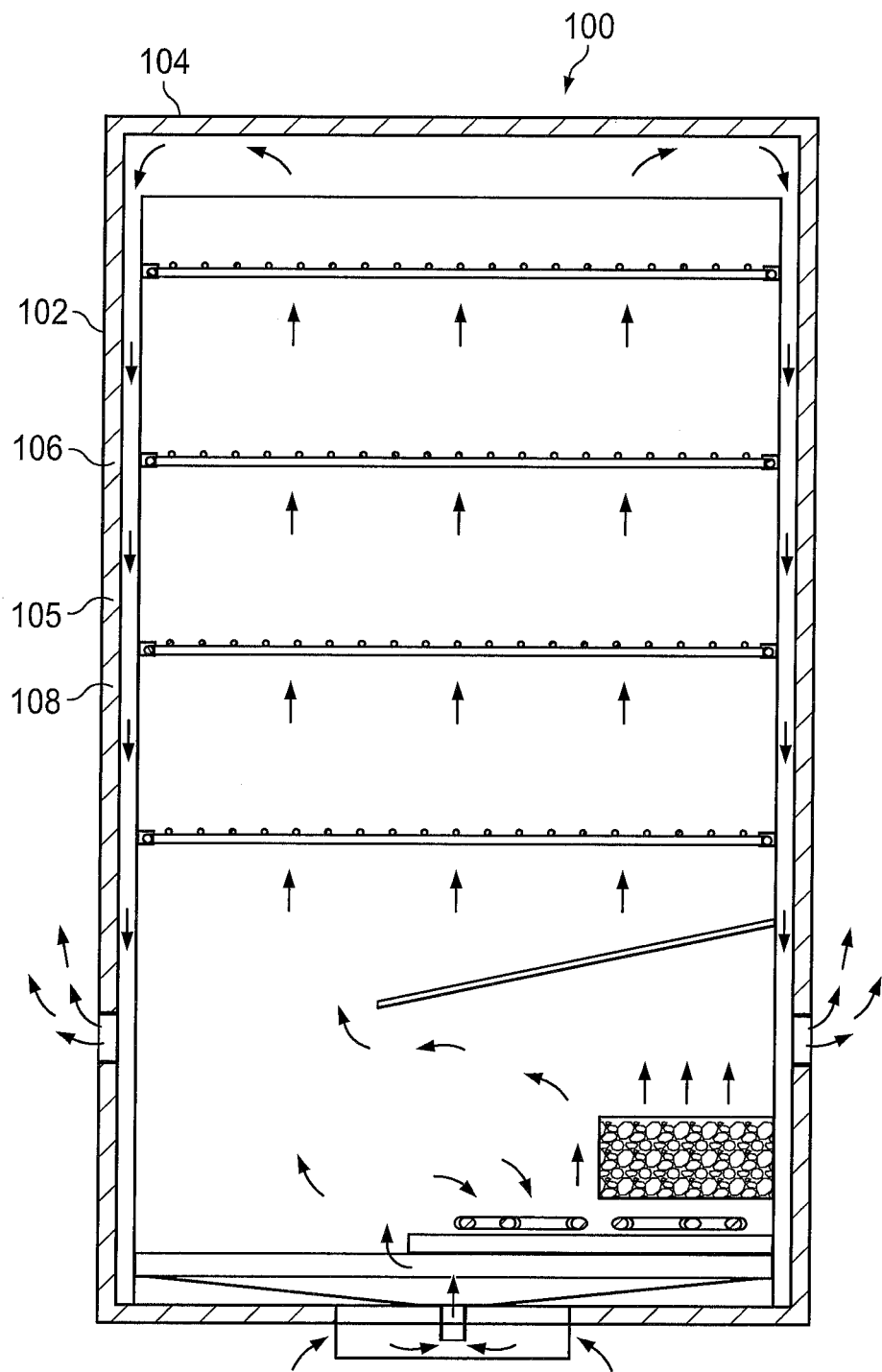
FIG. 3 is a schematic cutaway elevational front view of an alternative embodiment 100 of the inventive upright electric roasting and smoking apparatus.
Figure 4:
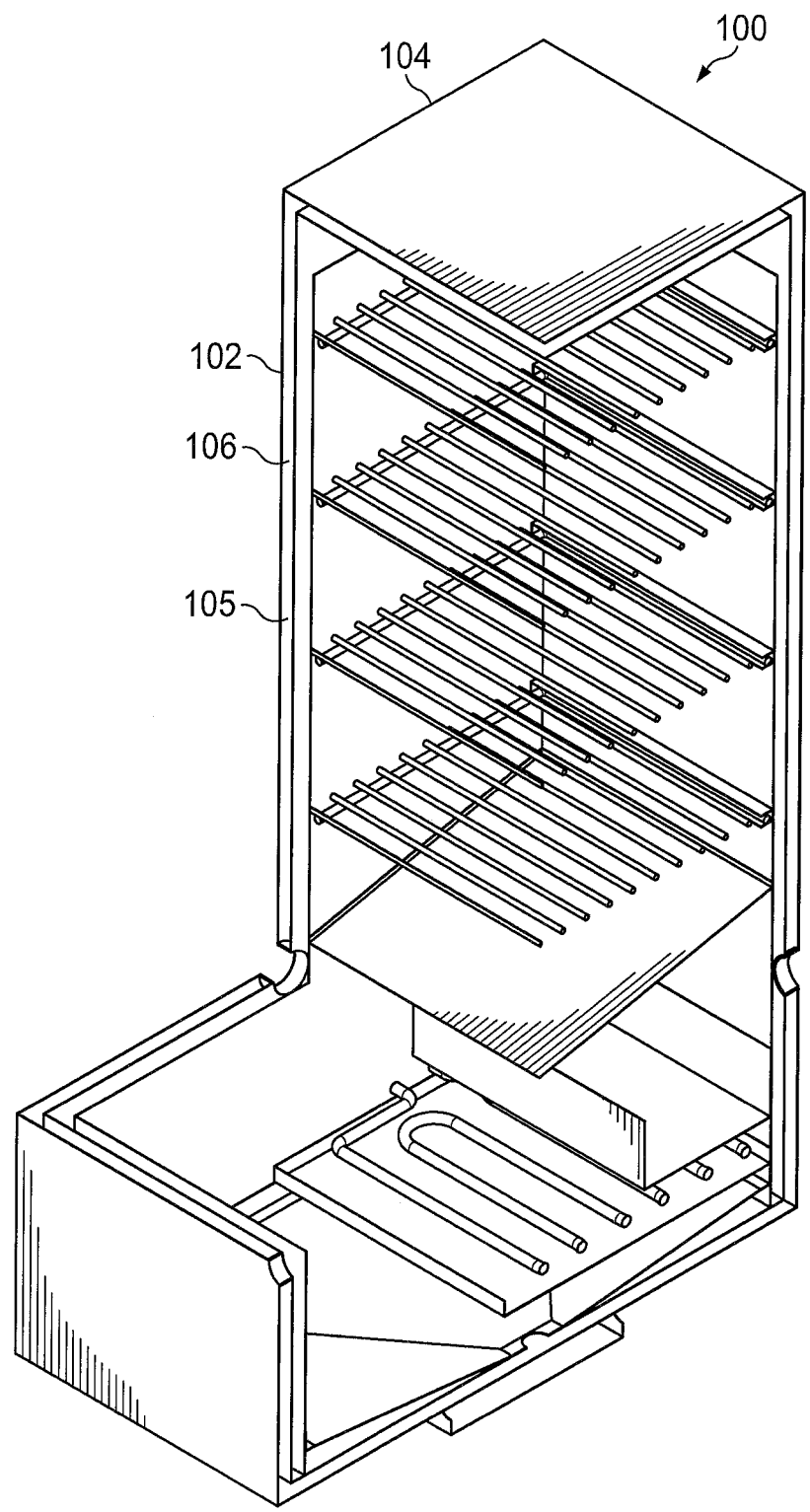
FIG. 4 is a cutaway perspective view of the inventive upright electric roasting and smoking apparatus 100.

An alternative embodiment 100 of the inventive upright electrical roasting and/or smoking apparatus is illustrated in FIGS. 3 and 4. The embodiment 100 of the inventive apparatus is substantially identical to embodiment 2 except that the outer housing 104 of the apparatus 100 includes an additional exterior wall 102 which is positioned outside of and spaced apart from an interior housing wall 105 to provide an insulating gap 106 between the inner and outer walls of the housing 104. The insulating gap 106 can be an empty air insulating gap, as illustrated in FIG. 4, or can be filled with an insulating material 108 shown in FIG. 3. The insulating gap 106, and insulating material 108 if used, will preferably be provided on all sides and in the top and bottom of the inventive upright electrical apparatus 100.

Figure 5:
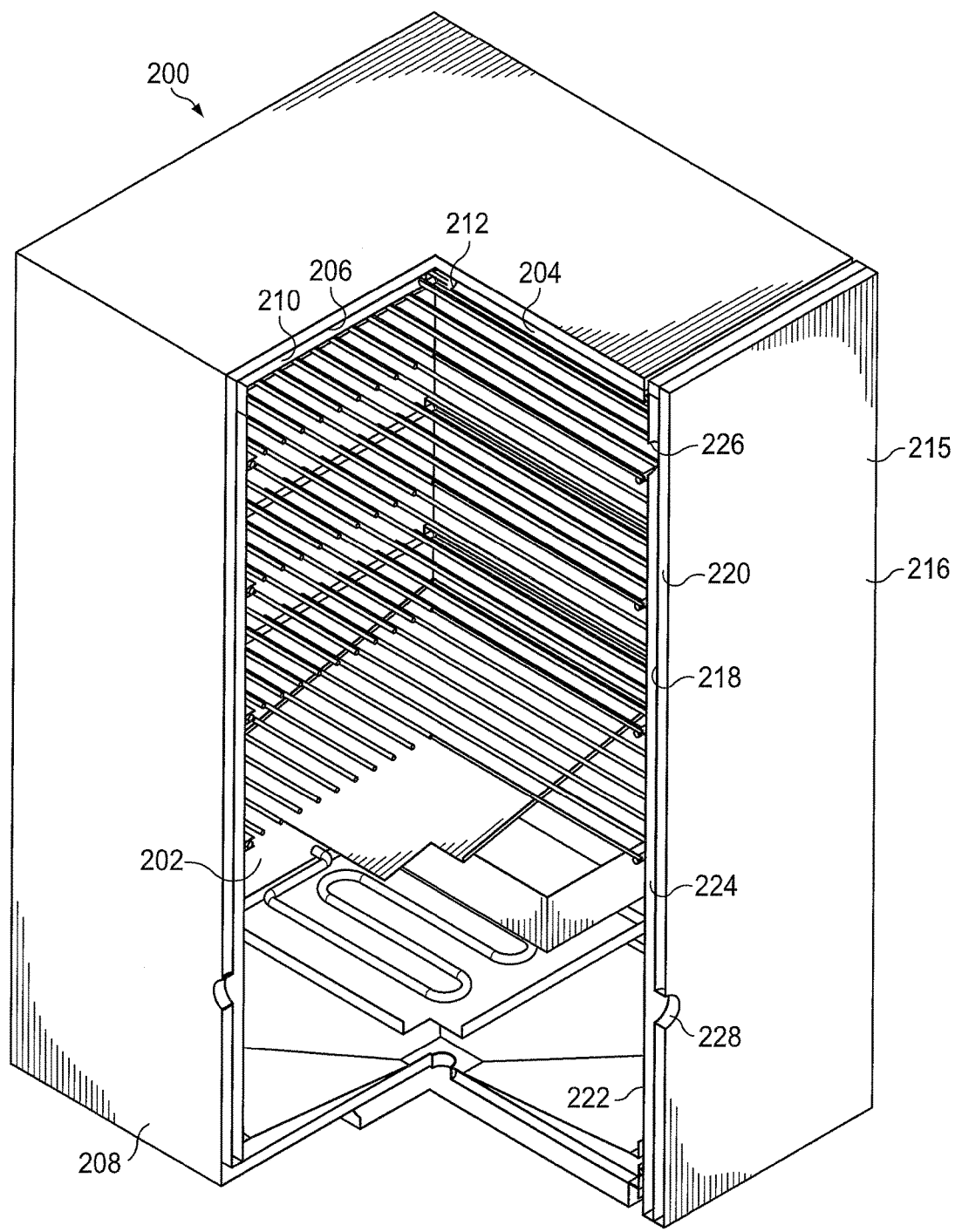
FIG. 5 is a partially cutaway perspective view of an alternative embodiment 200 of the inventive upright electric roasting and smoking apparatus.
Figure 6:
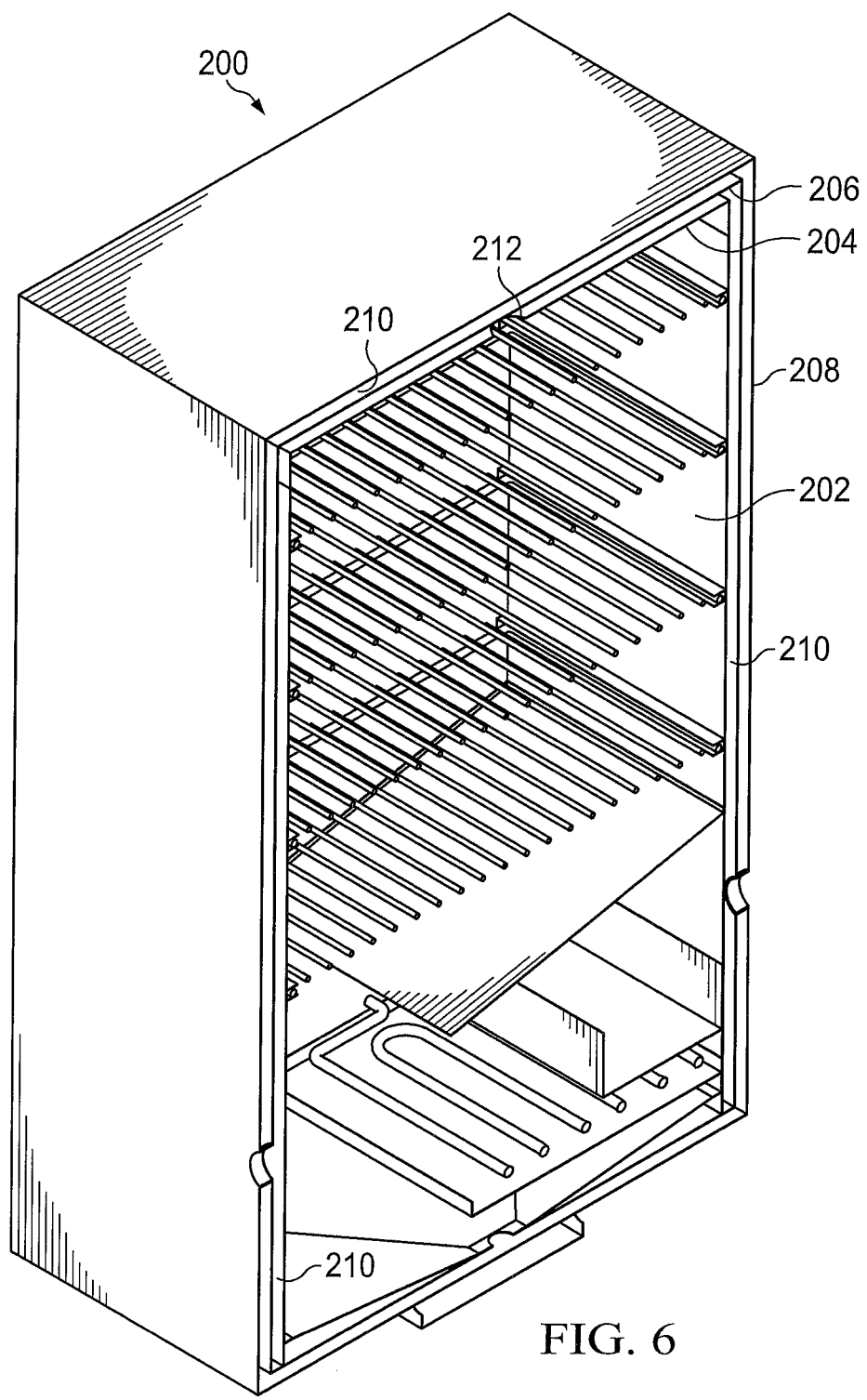
FIG. 6 is another cutaway perspective view of the inventive upright electric roasting and smoking apparatus 200.
Figure 7:
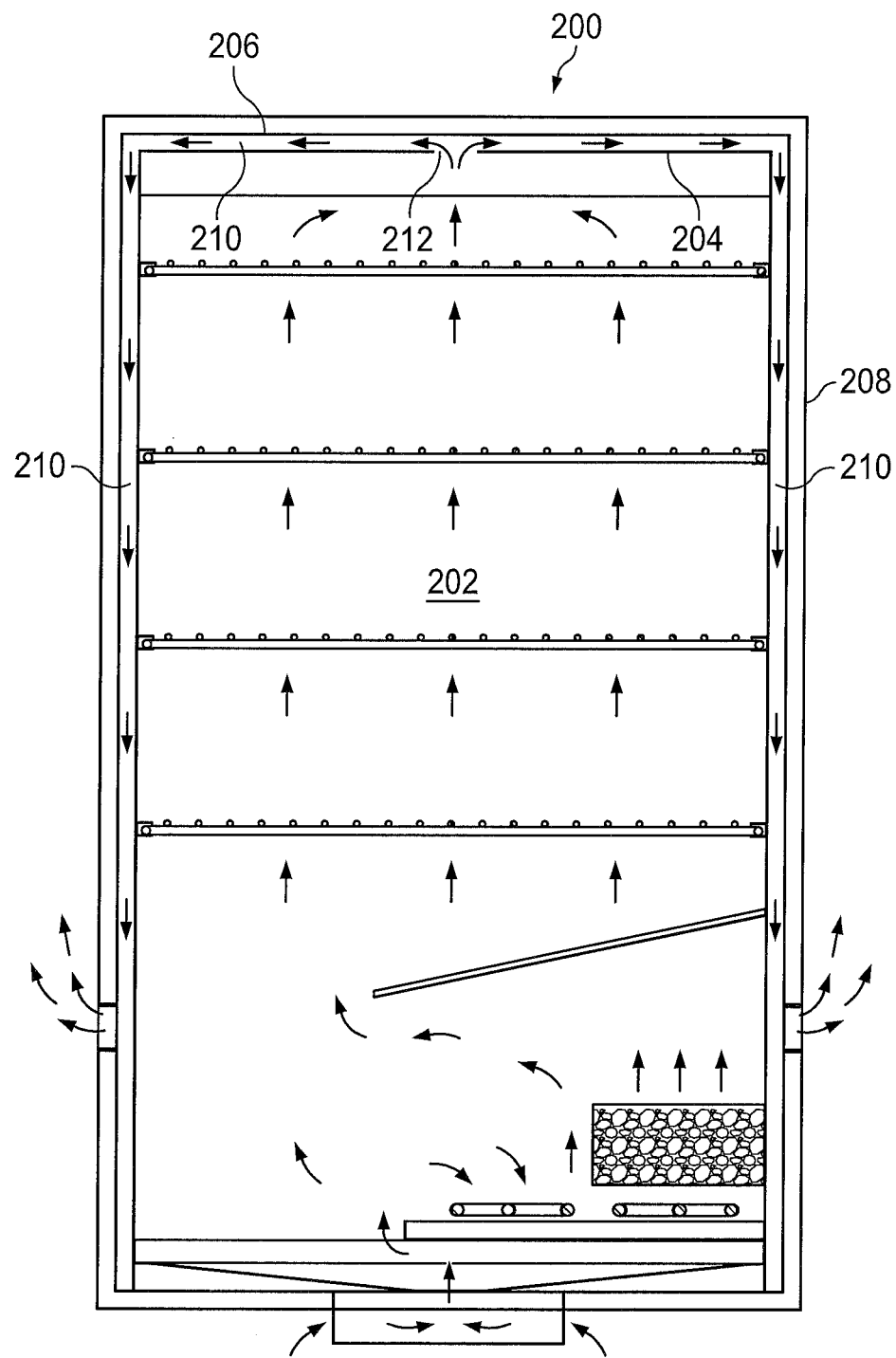
FIG. 7 is a schematic cutaway elevational front view of the inventive upright electric roasting and smoking apparatus 200.

A third embodiment 200 of the inventive upright electric roasting and smoking apparatus is illustrated in FIGS. 5-7. The embodiment 200 is substantially identical to the embodiment 100 of the inventive apparatus except that the interior heating chamber 202 also includes a horizontal top wall 204 which is positioned adjacent to and spaced apart from the horizontal top interior wall 206 of the housing 208. Consequently, the interior air flow gap 210 of the inventive apparatus 200 extends both horizontally across the top of the unit and downwardly through the left, right, and back sides. The horizontal top wall 204 of the heating chamber 202 includes a centralized top inlet opening 212 for the air flow gap 210 for receiving the hot air and smoke which flows upwardly through the heating chamber 202.

In addition, unlike the double-walled door 34 of the inventive apparatus 2 illustrated in FIG. 1, the door 215 of the inventive unit 200 comprises: a vertical outer wall 216;

a vertical middle wall 218; a vertical insulating gap 220 formed between the outer wall 216 and the middle wall 218; a vertical inner wall 222; a vertical air flow gap 224 formed between the inner wall 222 and the middle wall 218; an upper hot air inlet 226 for the vertical air flow gap 224 formed through the inner wall 222; and a lower air outlet 228 for the vertical air flow gap 224 formed through the middle and outer walls 216 and 218. The vertical insulating gap 220 in the door 215 can be an air insulating gap or can be filled with an insulating material.

An alternative hot air exhaust configuration for the vertical air flow gap 224 of the door 215 of the inventive unit 200 is illustrated in FIGS. 8 and 9. Rather than exhausting directly to the atmosphere through a lower opening 228 formed through both the middle and outer walls 218 and 216 of the door, the vertical air flow gap 232 of the alternative door 230 illustrated in FIGS. 8 and 9 is configured to exhaust into the lower portion of air flow gap 210 provided within the side walls of the unit housing 208. The alternative door exhaust configuration illustrated in FIGS. 8 and 9 comprises: lower left and right front openings 236 and 238 formed in the front facing left and right vertical edges 240 and 242 of the housing air flow gap 210 on each side of the front opening 244 of the housing 208; a pair of corresponding lower left and right openings 246 and 248 formed in the peripheral portion of the inner wall 222 of the door; a sealing element or sealing element arrangement 250 attached either around the periphery of the inner wall of the door 230 or around the front opening 244 of the housing 208 for sealing the front opening 244 when the door 230 is closed; and holes or other passageways 252 and 254 formed in or by the door sealing element or arrangement 250 for sealingly providing fluid communication through the sealed passageways 252 and 254 between the lower left and right openings 246 and 248 of the door air flow gap 232 and the corresponding opposing lower left and right openings 236 and 238 of the housing air flow gap 210.

Figure 10:
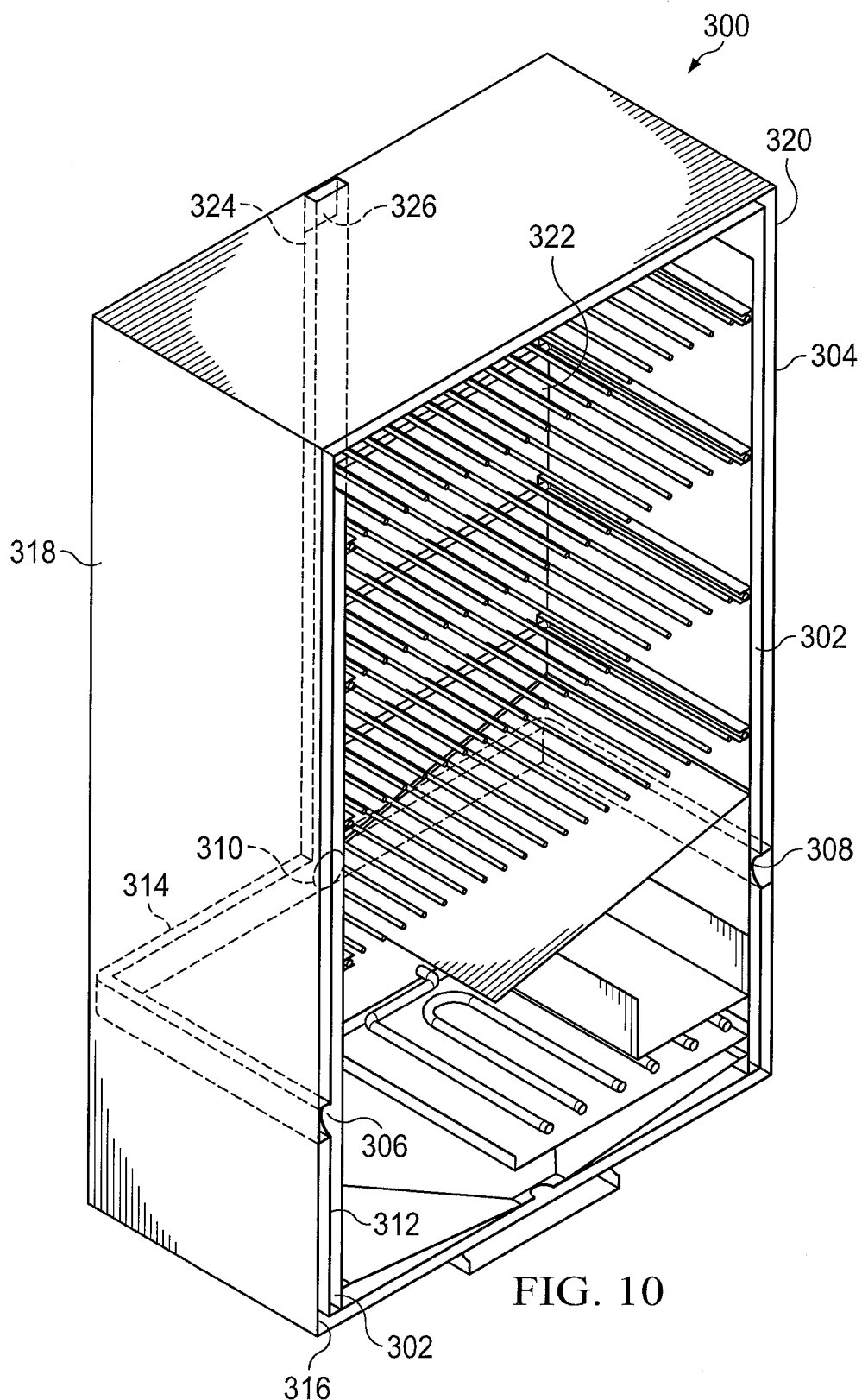
FIG. 10 is a cutaway perspective view of an alternative embodiment 300 of the inventive upright electric roasting and smoking apparatus.
Figure 11:
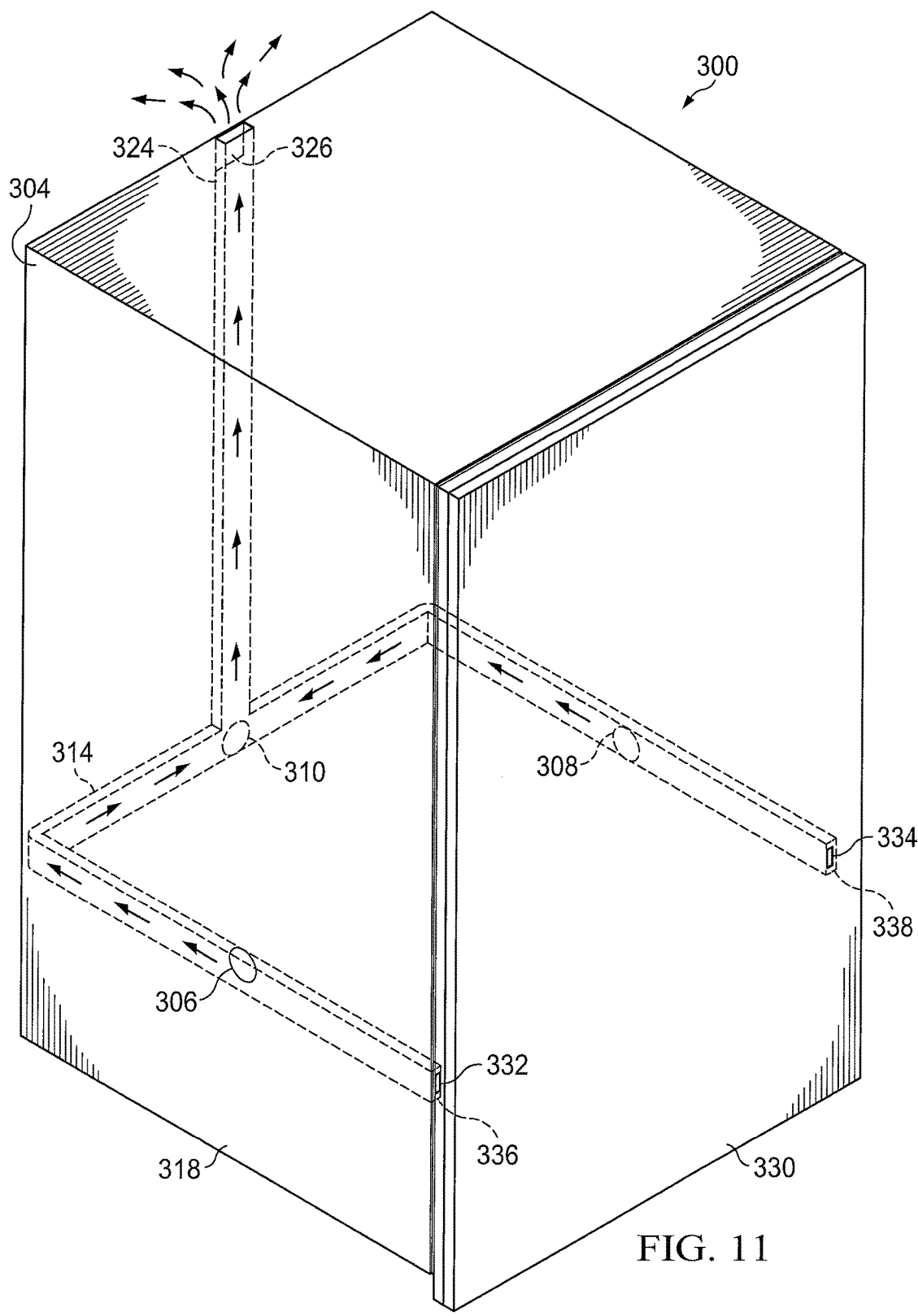
FIG. 11 is an outer perspective view of the inventive upright electric roasting and smoking apparatus 300 which schematically illustrates an exhaust channel installed within the walls of the unit housing 304.

Another embodiment 300 of the inventive upright electrical roasting and smoking apparatus is illustrated in FIGS. 10 and 11. The inventive apparatus 300 is substantially identical to the inventive apparatus 100 except that, rather than venting the hot air exhaust directly from the interior vertical hot air flow gap 302 to the atmosphere on the lower left, right, and back sides 318, 320, and 322 of the unit housing 304, the exhaust gas flows through lower left, right, and back side exhaust openings 306, 308, and 310 formed in the inner wall 312 of the housing 304 and then into a horizontal exhaust channel or other conduit 314 which is positioned between the inner wall 312 and the outer wall 316 of the housing 304. The horizontal exhaust channel 314 extends through the left, right, and back sides 318, 320, and 322 of the housing 304. All of the exhaust gas received in the horizontal channel 314 flows into the bottom end of a vertical channel 324 positioned between the inner and outer walls 312 and 316 in the back side 322 of the housing 304. The exhaust gas then flows upwardly through the vertical channel 324 and is discharged to the atmosphere via a single upper exhaust opening 326 on the backside 322 of the unit 300. FIG. 11 also illustrates the positioning of two left and right exhaust openings 332 and 334 in the door 330 of the unit 300 for delivering and venting exhaust gas flowing downwardly through the door 330 into the left and right forward ends 336 and 338 of the horizontal exhaust flow channel 314.

Routing all of the hot air exhaust to an upper rear outlet 326 in this manner makes the smoke more visible, so that the user can see that the unit is operating as desired, and prevents the smoke from discharging into the user's face. It will also be understood that a similar ducting system could be used to deliver all of the exhaust gas to any other single discharge location at any elevation and on any side of the unit.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An apparatus for roasting food products, smoking food products, or a combination thereof, said apparatus comprising:
    an upright housing having an upright housing wall and a bottom;
    an upright heating chamber within said upright housing, said upright heating chamber being defined within an upright heating chamber wall which is positioned within said upright housing wall and which surrounds said upright heating chamber on three vertical sides;
    an upright door on said upright housing for opening and closing a fourth vertical side of said upright heating chamber;
    a heating chamber air inlet which is provided in said bottom of said upright housing and through which air is received in said upright heating chamber;
    at least one electric heating element which is positioned in a lower portion of said upright heating chamber and which heats said air received through said heating chamber air inlet;
    a flow passage which is formed within said upright housing between said upright heating chamber wall and said upright housing wall and which surrounds said upright heating chamber on said three vertical sides;
    a plurality of food support racks positioned or removably positionable in said upright heating chamber above said at least one electric heating element for holding said food products, said food support racks including an upper-most food support rack and a lower-most food support rack;
    a smoker box, pan, or tray, for holding a smoke producing material, which is removably positionable in said upright heating chamber above said at least one electric heating element and below said lower-most food support rack;
    a barrier shield in said upright heating chamber above said smoker box, pan, or tray and below said lower-most food support rack, wherein said barrier shield shields said at least one electric heating element and said smoker box, pan, or tray from drippage from said lower-most food support rack and shields at least most of said lower-most food support rack from direct exposure to said at least one electric heating element;
    an upper inlet for said flow passage in an upper portion of said upright heating chamber at an elevation above said upper-most food support rack; and
    a lower outlet for said flow passage located elevationally below said upper inlet for said flow passage at a location which is from 60% to 98% of a distance downward from an interior top of said upright heating chamber to said at least one electric heating element, said upright heating chamber and said flow passage defining a flow path for said air heated by said at least one electric heating element in which said air heated by said at least one electric heating element flows upwardly through said upright heating chamber from said at least one electric heating element, around said barrier shield, and onward to said upper inlet for said flow passage and then flows downwardly through said flow passage, outside of said upright heating chamber, from said upper inlet for said flow passage to said lower outlet for said flow passage such that as said air heated by said at least one electric heating element flows downwardly through said flow passage it contacts and heats said upright heating chamber wall on said three vertical sides, and said upright heating chamber wall having no openings therethrough in communication with said flow passage, on any of said three vertical sides, below said upper inlet for said flow passage such that:
  a) until said air heated by said at least one electric heating element reaches said upper inlet for said flow passage, said upright heating chamber wall prevents said air heated by said at least one electric heating element from entering said flow passage from said upright heating chamber as said air heated by said at least one electric heating element flows upwardly through said upright heating chamber and
  b) said upright heating chamber wall prevents said air heated by said at least one electric heating element from entering said upright heating chamber from said flow passage as said air heated by said at least one electric heating element flows downwardly through said flow passage.

2. The apparatus of claim 1 wherein said lower outlet for said flow passage comprises one or more openings through said upright housing wall.

3. The apparatus of claim 1 wherein:
said upright housing has a closed upper end;
said upright heating chamber wall has an upper end which is spaced below said closed upper end of said upright housing to form a gap on said three vertical sides; and
said gap between said upper end of said upright heating chamber wall and said closed upper end of said upright housing on said three vertical sides forms said upper inlet for said flow passage.

4. The apparatus of claim 1 wherein:
said upright housing has a closed upper end;
said apparatus further comprises a laterally extending heating chamber top wall in said upright housing which is spaced below said closed upper end of said housing to provide a gap between said heating chamber top wall and said closed upper end of said housing which forms a laterally extending top portion of said flow passage; and
said upper inlet for said flow passage comprises at least one opening provided through said heating chamber top wall.

5. The apparatus of claim 1 wherein:
said upright door has an upright flow passage therein and when said upright door is closed on said fourth vertical side of said upright heating chamber, said upright flow passage of said door is adjacent to said upright heating chamber and an inlet for said upright flow passage of said door for receiving said air heated by said at least one electric heating element is provided in said upper portion of said upright heating chamber.

6. The apparatus of claim 1 further comprising an insulating material in said upright housing outside of and adjacent to said flow passage.

7. The apparatus of claim 1 further comprising an air-filled insulation gap in said upright housing outside of and adjacent to said flow passage.

8. The apparatus of claim 1 further comprising an exhaust collection channel in said upright housing wherein:
said lower outlet of said flow passage is in fluid communication with said exhaust collection channel;
said exhaust collection channel has an exhaust outlet; and
said flow path defined through said upright housing for said air heated by said at least one electric heating element further extends through said lower outlet of said flow passage into said exhaust collection channel and extends through said exhaust collection channel to said exhaust outlet.

9. The apparatus of claim 8 wherein said exhaust outlet is located on an upper portion of a rear side of said upright housing.

10. The apparatus of claim 1 wherein said upright housing wall is formed of reflective aluminized steel.

11. The apparatus of claim 1 wherein an interior surface of said upright heating chamber wall facing said upright heating chamber has a black porcelain coating thereon.

\* \* \* \* \*